(12) United States Patent
Lin

(10) Patent No.: US 10,563,687 B2
(45) Date of Patent: Feb. 18, 2020

(54) SCREW CAPABLE OF CUTTING AND COMPRESSING DREGS IN AN OBJECT TO BE DRILLED

(71) Applicant: Teng-Hung Lin, Taipei (TW)

(72) Inventor: Teng-Hung Lin, Kaohsiung (TW)

(73) Assignee: Fong Pypan Industrial Co., LTD., Kaohsiung (TW)

( * ) Notice: Subject to any disclaimer, the term of this patent is extended or adjusted under 35 U.S.C. 154(b) by 0 days.

(21) Appl. No.: 16/264,641

(22) Filed: Jan. 31, 2019

(65) Prior Publication Data
US 2019/0162224 A1 May 30, 2019

Related U.S. Application Data

(63) Continuation of application No. 15/255,100, filed on Sep. 1, 2016, now abandoned.

(51) Int. Cl.
*F16B 35/06* (2006.01)
(52) U.S. Cl.
CPC .................. *F16B 35/065* (2013.01)
(58) Field of Classification Search
CPC ........................................ F16B 23/00
USPC ........................................ 411/399
See application file for complete search history.

(56) References Cited

U.S. PATENT DOCUMENTS

| | | | | |
|---|---|---|---|---|
| 1,151,861 A * | 8/1915 | Brumback | ............. | F16B 35/06 411/399 |
| 3,903,784 A * | 9/1975 | Dekker | ................. | F16B 35/065 411/399 |
| 5,518,352 A * | 5/1996 | Lieggi | ................. | F16B 25/0031 411/188 |
| 2009/0123253 A1* | 5/2009 | Hettich | ................. | F16B 35/065 411/399 |
| 2015/0063947 A1* | 3/2015 | Huang | ................. | F16B 35/065 411/393 |
| 2016/0265578 A1* | 9/2016 | Lin | ........................ | F16B 35/065 |

* cited by examiner

*Primary Examiner* — Gary W Estremsky

(57) ABSTRACT

A screw capable of cutting and compressing dregs in an object to be drilled has a tapered head with a larger upper end and a small lower end, and a tapered surface being formed between the larger upper end and the small lower end; and at least one rib winding around the tapered surface of the head. Each of the rib is formed by an outer wall and an inner wall the connection of the inner wall and outer wall is formed as a sharp knife portion which winds around the tapered surface of the tapered head; and the outer wall is inclined so that a lower distal side of the outer wall is more near a center axis of the tapered head; and the inner wall is inclined so that an upper distal end of the inner wall is more near a center axis of the tapered head.

2 Claims, 2 Drawing Sheets

SCREW CAPABLE OF CUTTING AND COMPRESSING DREGS IN AN OBJECT TO BE DRILLED

The present invention is a continuation in part (CIP) of U.S. patent application Ser. No. 15/255,100, which is filed by the applicant of the present invention and therefore, contents of the U.S. patent application Ser. No. 15/255,100 is incorporated into the present invention as a part of the invention.

FIELD OF THE INVENTION

The present invention relates to screws; and in particular to a screw with winding ribs thereon for cutting dregs in drilling and compressing the dregs therein so that the dregs expose out after screwing.

BACKGROUND OF THE INVENTION

Screws are used to fix one object to another one. The design of the screw is based on the materials and characteristics of the materials.

However, in screwing, material features of the screw, such as hardness, density and textures of the materials, will induce the problems such that in drilling, the dregs from drilling left on outer side of the wall of the object to be drilled so as to deteriorate the appearance of the object to be drilled. To improve such problem, ribs, such as block-form ribs, linear ribs, arc ribs, sharp ribs and others, are developed to prevent the problem of the dregs on the outer side of the object to be drilled. However, all the prior arts are not perfect.

SUMMARY OF THE INVENTION

To improve above mentioned problem of the prior art, the present invention provides a new screw which can cause that the dregs in screwing are compressed into the object so as to tighten the screw to the object to be drilled and no dregs expose out.

To achieve above objective, the present invention provides a screw capable of cutting dregs and compressing dregs in an object to be drilled, comprising: a tapered head (1) with a larger upper end and a small lower end, and a tapered surface being formed between the larger upper end and the small lower end; and at least one rib (2, 3) winding around the tapered surface of the head; wherein each of the rib (2, 3) is formed by an outer wall (21, 31) and an inner wall (22, 32); the connection of the inner wall (22, 32) and outer wall (21, 31) is formed as a sharp knife portion (C) which winds around the tapered surface of the tapered head (1); and the outer wall (21, 31) is inclined so that a lower distal side of the outer wall (21, 31) is more near a center axis of the tapered head (1) than an upper distal end of the outer wall (21, 31); and the inner wall (22, 32) is inclined so that an upper distal end of the inner wall (22, 32) is more near a center axis of the tapered head (1) than a lower end of the inner wall (22, 32); there are two ribs (2, 3); and each rib (2, 3) winds around the tapered surface of the head through an angle equal to or larger than 360 degrees.

Therefore, by above mentioned structure, in screwing, the ribs around the head will cut the dregs in drilling of the screw and then the dregs will be compressed by the head and then are pressed by the head into the object to be drilled so as to increase the tightness of the screws to the object to be drilled. Furthermore the outer side of the object is clean. The screw is tightly engaged to the object to be drilled.

DESCRIPTION OF THE INVENTION

In order that those skilled in the art can further understand the present invention, a description will be provided in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
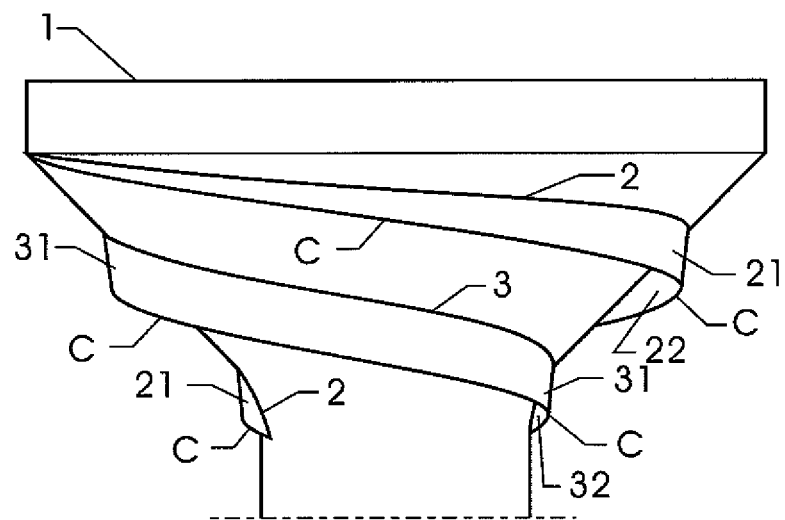
FIG. 1 shows the embodiment of the present invention.
Figure 2:
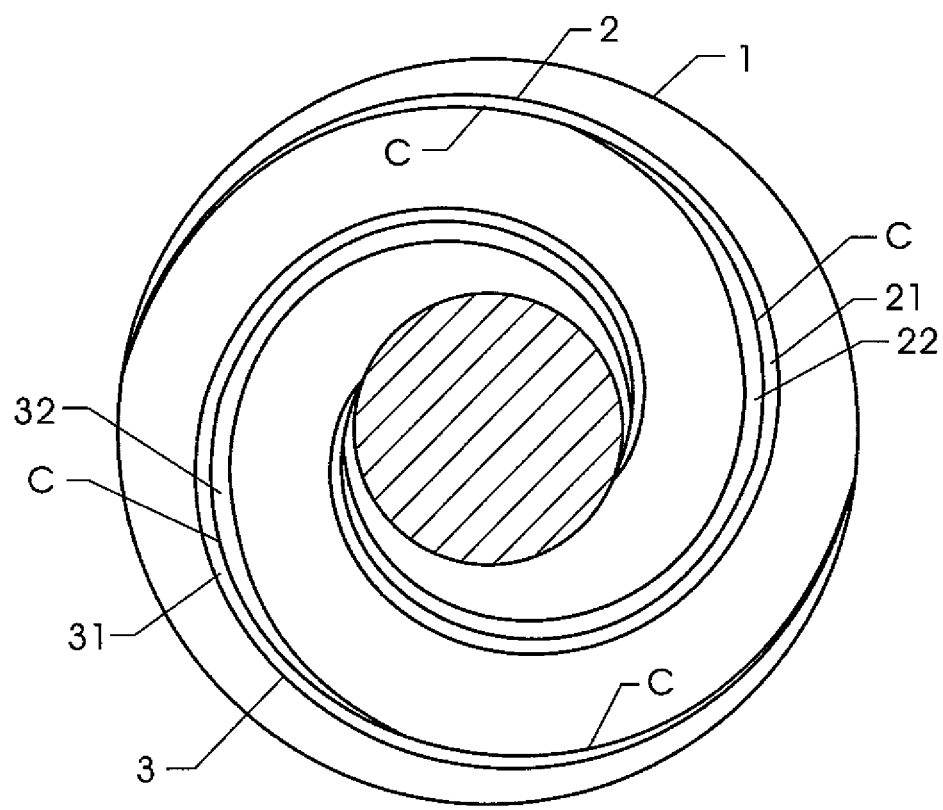
FIG. 2 is an elevational view of the present invention.
Figure 3:
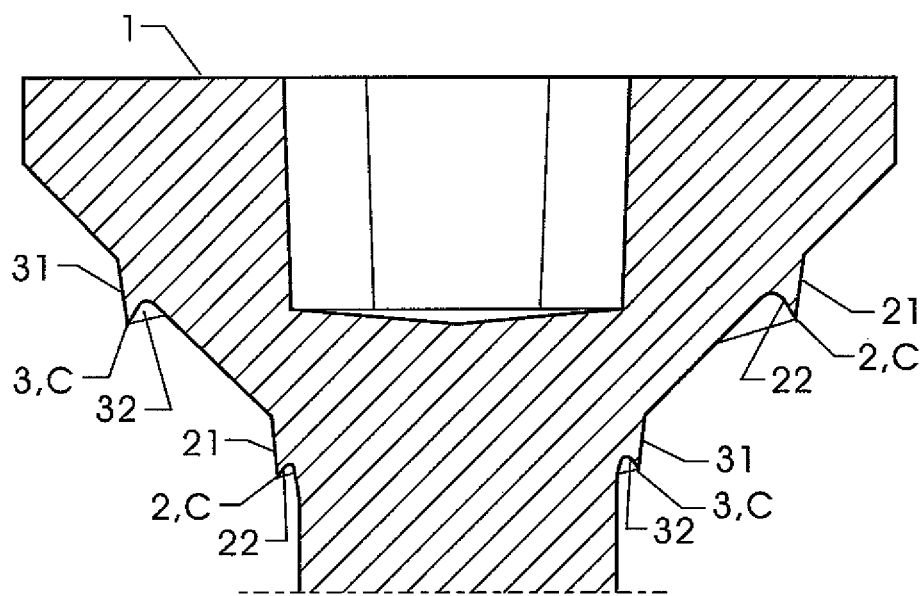
FIG. 3 is a cross sectional view of the present invention.
Figure 4:
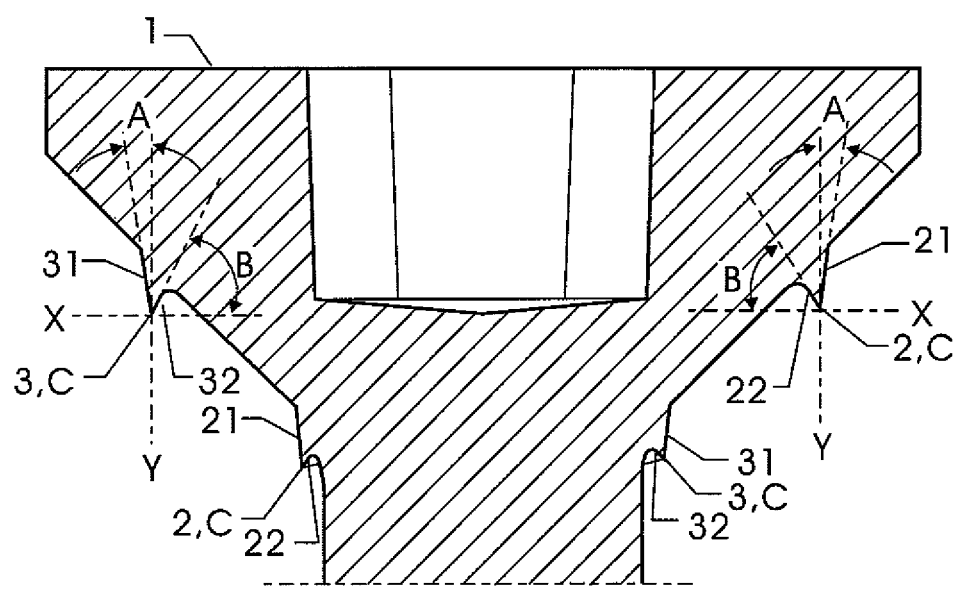
FIG. 4 is a schematic view showing the angle relation of the outer wall and inner wall of the rib of the present invention.

With reference to FIG. 1, the structure of the present invention is illustrated. The present invention includes a tapered head 1 with a larger upper end and a small lower end. At least one rib 2, 3 is formed on and winds around the tapered surface of the head with a winding angle larger or equal to 360 degrees. In this embodiment, two ribs 2, 3 are shown. The ribs winds around the head counterclockwise.

Each of the ribs 2, 3 is formed by an outer wall 21, 31 with a slope A with respect to an outer wall of the tapered surface of the head and an inner wall 22, 32 with a slope B with respect to an outer wall of the tapered surface of the head. The connection of the inner wall 22,32 and outer wall 21,31 is formed as a sharp knife portion C. In this embodiment, a Y axis is defined as an axis parallel to an axis of the head and the stem of the screw and an X axis is an axis vertical to the X axis. As illustrated in the drawings, the outer wall 21,31 is in the right upper area divided by the X axis and the Y axis, and the inner wall 22,32 is in the left upper area divided by the X axis and the Y axis. The knife C is a spiral knife winding around the tapered surface of the head.

By above mentioned structure, in screwing, the ribs around the head will cut the dregs in drilling of the screw and then the dregs will be compressed by the head and then are pressed by the head into the object to be drilled so as to increase the tightness of the screws to the object to be drilled. Furthermore the outer side of the object is clean. The screw is tightly engaged to the object to be drilled.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A screw capable of cutting and compressing dregs in an object to be drilled, comprising:
    a tapered head (1) with a larger upper end and a small lower end, and a tapered surface being formed between the larger upper end and the small lower end; and at least one rib (2, 3) winding around the tapered surface of the head;
    wherein each said at least one rib (2, 3) is formed by an outer wall (21, 31) and an inner wall (22, 32); a connection of the inner wall (22, 32) and outer wall (21, 31) is formed as a sharp knife portion (C) which winds around the tapered surface of the tapered head (1); and the outer wall (21, 31) is inclined so that a lower distal side of the outer wall (21, 31) is more near a center axis of the tapered head (1) than an upper distal end of the outer wall (21, 31); and the inner wall (22, 32) is inclined so that an upper distal end of the inner wall (22, 32) is more near a center axis of the tapered head (1) than a lower end of the inner wall (22, 32); and wherein each rib (2, 3) winds around the tapered surface of the head through an angle equal to or larger than 360 degrees.

2. The screw capable of cutting and compressing dregs in an object to be drilled as claimed in claim 1, wherein there are two ribs (2, 3).

\* \* \* \* \*